US011130138B2

(12) United States Patent
Dougherty et al.

(10) Patent No.: US 11,130,138 B2
(45) Date of Patent: Sep. 28, 2021

(54) MULCHER TOOTH

(71) Applicant: Dougherty Forestry Manufacturing, Ltd. Co., Hinton, OK (US)

(72) Inventors: Patrick Dougherty, Hinton, OK (US); James Andrew Dougherty, Hinton, OK (US)

(73) Assignee: Dougherty Forestry Manufacturing, Ltd. Co., Hinton, OK (US)

( * ) Notice: Subject to any disclaimer, the term of this patent is extended or adjusted under 35 U.S.C. 154(b) by 167 days.

(21) Appl. No.: 16/600,439

(22) Filed: Oct. 11, 2019

(65) Prior Publication Data

US 2021/0105958 A1  Apr. 15, 2021

(51) Int. Cl.
*B02C 18/18* (2006.01)
*A01G 23/00* (2006.01)
*A01D 34/52* (2006.01)

(52) U.S. Cl.
CPC ............ *B02C 18/184* (2013.01); *A01D 34/52* (2013.01); *A01G 23/00* (2013.01); *B02C 18/18* (2013.01); *Y10T 83/9319* (2015.04)

(58) Field of Classification Search
CPC ............. Y10T 83/9372; Y10T 83/9319; Y10T 83/9329; Y10T 83/9331; Y10T 83/9365; Y10T 83/9367; B23D 61/04; B23D 61/06; B23D 61/065; B23D 61/14; B23D 61/16; B27B 33/144; B27B 33/142; A01G 23/00; A01D 34/52; B02C 18/18; B02C 18/184; B27C 1/00
USPC ......... 241/294; 144/218, 230, 236, 240, 241
See application file for complete search history.

(56) References Cited

U.S. PATENT DOCUMENTS

| 3,203,488 A | 8/1965 | Eastwood |
| 3,274,908 A | 9/1966 | Grant et al. |
| 3,358,569 A | 12/1967 | Averette |
| 3,490,117 A | 1/1970 | Hertel |
| 4,951,883 A | 8/1990 | Loppoli et al. |
| 5,052,757 A | 10/1991 | Latham |
| 5,259,692 A | 11/1993 | Beller et al. |
| 5,395,286 A | 3/1995 | Sgariboldi |
| 5,647,263 A | 7/1997 | Wildey |
| 6,152,658 A | 11/2000 | Satran et al. |
| D517,104 S | 3/2006 | East |
| 7,082,743 B1 | 8/2006 | Erickson et al. |
| 7,938,350 B2 | 5/2011 | Doppstadt et al. |
| 7,980,278 B2 | 6/2011 | Labbe et al. |
| 9,511,375 B2 | 12/2016 | Doppstadt et al. |
| 9,738,047 B2 | 8/2017 | Thomas |
| D798,913 S | 10/2017 | Whittaker et al. |
| 9,943,037 B2 | 4/2018 | Stanley et al. |

(Continued)

*Primary Examiner* — Phong H Nguyen
(74) *Attorney, Agent, or Firm* — Crowe & Dunlevy, P.C.

(57) ABSTRACT

A tooth for use on a rotating element has a base attached to the rotating element and a cutter assembly removably attached to the base. The cutter assembly has an upper ramp surface and a blade. In another aspect, the tooth has a base attached to the rotating element and the base includes one or more base tab and slot elements. The tooth also includes a cutter assembly that has one or more cutter assembly tab and slot elements. Each of the one or more cutter assembly tab and slot elements is configured for a mating engagement with a corresponding one of the one or more base tab and slot elements. In another aspect, a rotary drum for use on a vegetation cutting machine includes a plurality of teeth that each have a base attached to the rotary drum and a cutter assembly removably attached to the base.

16 Claims, 7 Drawing Sheets

(56) References Cited

U.S. PATENT DOCUMENTS

| | | |
|---|---|---|
| D835,680 S | 12/2018 | Stanley et al. |
| D835,681 S | 12/2018 | Stanley et al. |
| D835,682 S | 12/2018 | Stanley et al. |
| D836,137 S | 12/2018 | Stanley et al. |
| 10,201,130 B2 | 2/2019 | Stanley et al. |
| 2006/0243466 A1 | 11/2006 | Beller et al. |
| 2007/0194161 A1 | 8/2007 | Doppstadt et al. |
| 2009/0158910 A1 | 6/2009 | Krehel |
| 2010/0011934 A1 | 1/2010 | Micacchi |
| 2013/0112792 A1 | 5/2013 | Doppstadt et al. |
| 2015/0282420 A1 | 10/2015 | Campey |
| 2017/0079219 A1 | 3/2017 | Stanley et al. |
| 2017/0297032 A1 | 10/2017 | Denis |

MULCHER TOOTH

FIELD OF THE INVENTION

The present invention generally relates to equipment used in forestry management and more particularly, but not by way of limitation, to equipment used to fell and mulch trees.

BACKGROUND OF THE INVENTION

A large variety of tree and brush cutting equipment exists on the market today. These devices range from chainsaws to bulldozers and are each designed to efficiently remove woody vegetation. Recently, compact tractors, track loaders and skid loaders have become popular in forestry management. These vehicles are relatively small and maneuverable and offer a wide range of modular tool attachments.

Brush mowers are a class of tools used with compact loaders that are often used to remove small trees. Brush mowers typically have a horizontal disc with free-swinging blades mounted on the perimeter of the disc. Centrifugal force deploys the swinging blades when the disc is rotated at high speeds. Although effective for smaller trees, the free-swinging blades are retracted when the saw contacts larger trees and the speed of the disc decreases. Before a cutting operation can recommence, the operator must allow the disc to return to cutting speed to deploy the swinging blades.

Manufacturers have also produced brush saws that include a horizontally-mounted drum that includes cutting teeth. The drum is weighted so that it carries momentum as it is rotated at speed. Once the drum is brought up to operating speed, the inertia of the drum cuts the material until the rotational speed decreases. The operator must then stop feeding the drum and wait for the speed and inertia to build back up. Because the drum is weighted and operates on inertia, these types of devices are not well-suited for smaller tractors.

Moreover, prior art drum-based devices include cutting teeth that are mounted directly to the drum in an offset, staggered arrangement. In some designs, a guard is placed just in front of the tooth to limit the engagement of the tooth on the vegetation. The incremental difference in height between the cutting edge and the guard provides a cutting depth control that improves the efficiency of the cutting operation. Over time, however, the guard wears down and a greater portion of the tooth is exposed during the cutting operation. This may reduce the efficiency of the drum and may accelerate wear on the tooth. Because the guard is welded or otherwise permanently affixed to the mulching drum, the entire drum may need to be replaced as the guards wear down. In light of the deficiencies in the prior art, there remains a need for an improved tooth design that provides better depth control while overcoming the reliability problems experienced in past designs. The present invention is directed at overcoming these and other deficiencies in the prior art.

SUMMARY OF THE INVENTION

In one embodiment, the present invention provides a tooth for use on a rotating element. The tooth has a base attached to the rotating element and a cutter assembly removably attached to the base. The cutter assembly has an upper ramp surface, a transition relief, and a blade.

In another aspect, the embodiments include a tooth for use on a rotating element. The tooth has a base attached to the rotating element and the base includes one or more base tab and slot elements. The tooth also includes a cutter assembly removably attached to the base. The cutter assembly includes one or more cutter assembly tab and slot elements. Each of the one or more cutter assembly tab and slot elements is configured for a mating engagement with a corresponding one of the one or more base tab and slot elements.

In yet another aspect, the embodiments include a rotary drum for use on a vegetation cutting machine. The rotary drum has a plurality of teeth that each have a base attached to the rotary drum and a cutter assembly removably attached to the base. The cutter assembly has a blade and an upper ramp surface that limits the exposure of the blade to the vegetation.

WRITTEN DESCRIPTION

Figure 1:
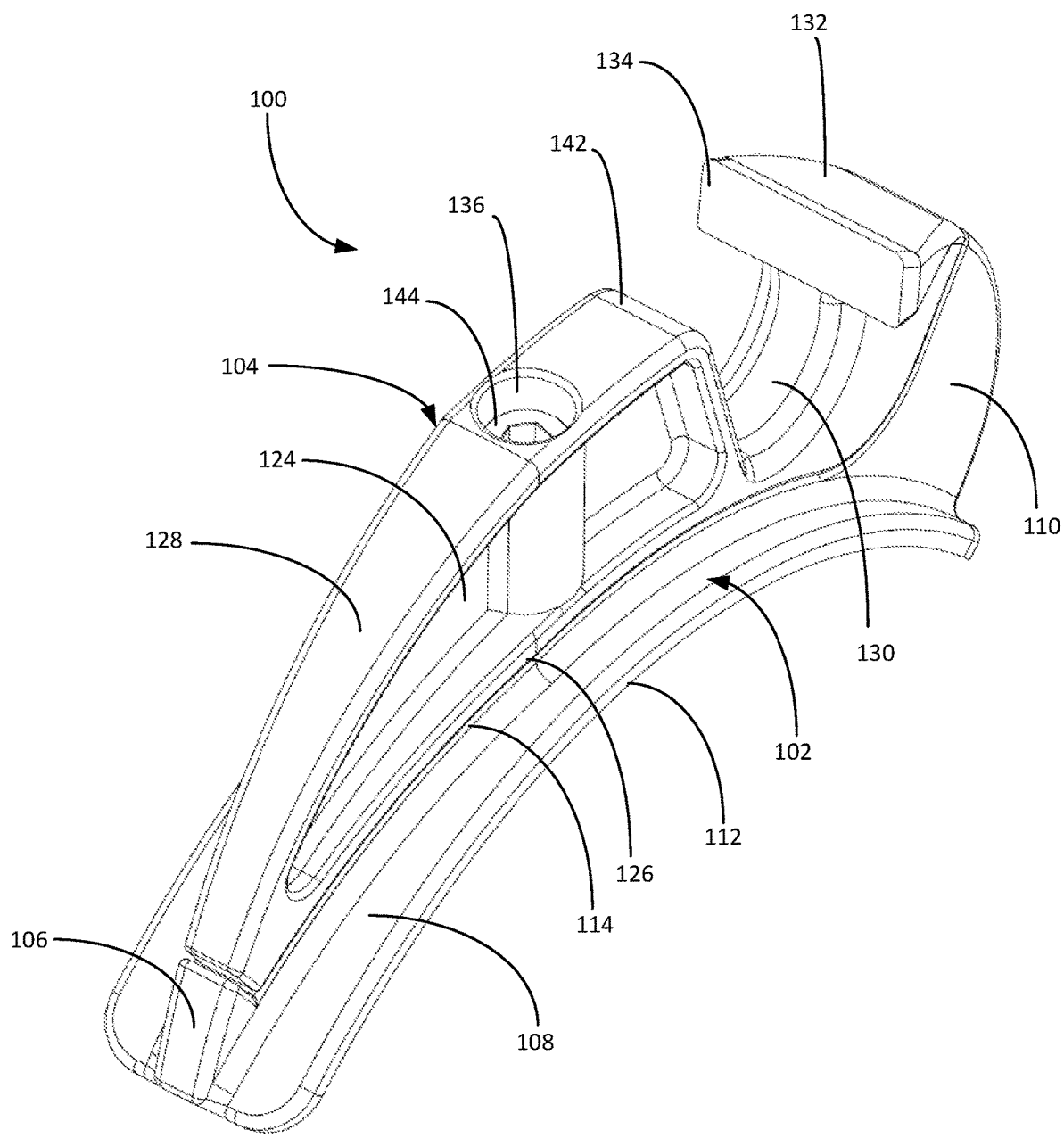
FIG. 1 is a front perspective view of a mulcher tooth constructed in accordance with an embodiment.

Referring to FIGS. 1-10, shown therein are various depictions of a mulcher tooth 100 that is configured to use on the rotary drum 200 of a mulcher machine (not shown). Although the tooth 100 may find utility in other applications, the tooth 100 is particularly well suited for use on equipment deployed in forestry management services that involve felling, grinding and mulching trees, brush and other vegetation. The tooth 100 can be configured for installation on a rotary horizontal drum that is configured to be connected to a tractor, such as a track loader. It will be appreciated that the tooth and drum can be any suitable prime mover, including for example, skid loaders and compact tractors with front-mounted articulating lift arms capable of safely supporting the weight of the mulcher.

The tooth 100 can be generally described as a two-piece unit that includes a base 102 and a cutter assembly 104 that is removably attached to the base 102. The base 102 includes a nose 106, a platform 108, and an upright portion 110. The platform 108 has a bottom surface 112 and an upper surface 114. The bottom surface 112 is configured to be welded or otherwise secured to the drum or other rotating element 200 (shown in FIG. 9). As depicted in FIGS. 1-10, the platform 108 is curved so that the bottom surface 112 conforms to the curvature of the rotating drum or other rotating element. The upper surface 114 is configured to be in contact with the cutter assembly 104.

The base 102 also includes a rear fastener bore 116 extending through the upright portion 110 and a vertical post 118 that has a front fastener bore 120. In exemplary embodiments, the rear fastener bore 116 and front fastener bore 120 each have internal threads that mate with corresponding threads on a bolt or other fastener. The base 102 optionally includes base tab and slot elements 122 that cooperate with the rear fastener bore 116 and front fastener bore 120 to retain the proper alignment and registration of the cutter assembly 104 and base 102, as described below. As depicted in FIGS. 1-10, the base stab and slot elements 122 include a rear tab on the upright portion 110 and an elongated tab on the upper surface 114. It will be appreciated that in other embodiments, the base tab and slot elements 122 have other configurations, including, for example, slots, or a mixture of tabs and slots on the base 102 configured for mating engagement with corresponding elements on the cutter assembly 104.

The cutter assembly 104 has a cutter body 124, a lower surface 126, an upper ramp surface 128, a transition relief 130, a blade support 132 and a blade 134. The lower surface 126 is configured to match the upper surface 114 of the base 102. The cutter body 124 has a central aperture 136 that is configured to receive the vertical post 118 of the base 102. The central aperture 136 is preferably configured so that a front fastener 144 (shown in FIG. 1) can be countersunk within the cutter body 124 when it is tightened within the front fastener bore 120. In this way, the fastener head is concealed within the cutter body 124 below the upper ramp surface 128.

Figure 2:
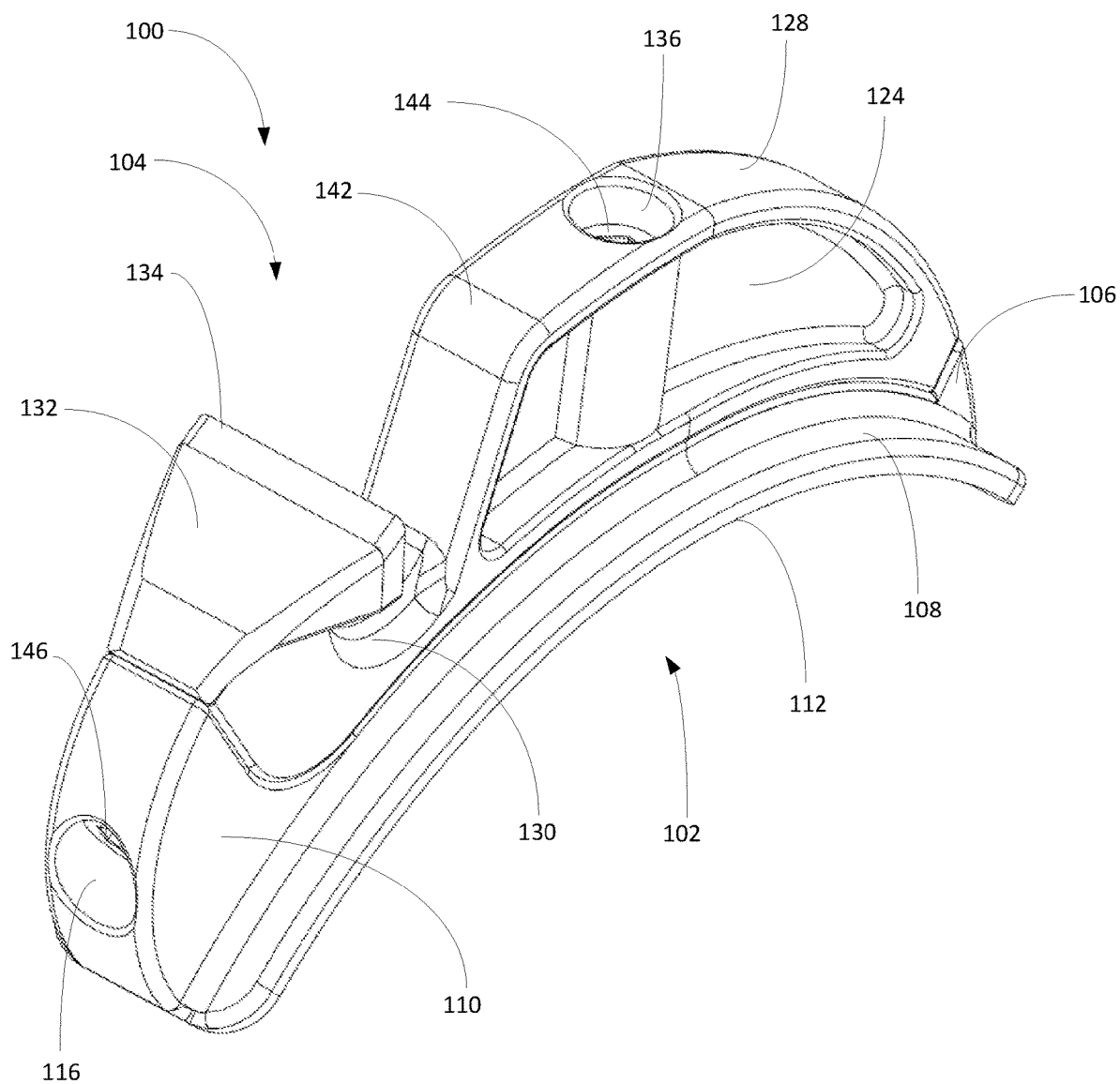
FIG. 2 is a rear perspective view of the mulcher tooth of FIG. 1.
Figure 3:
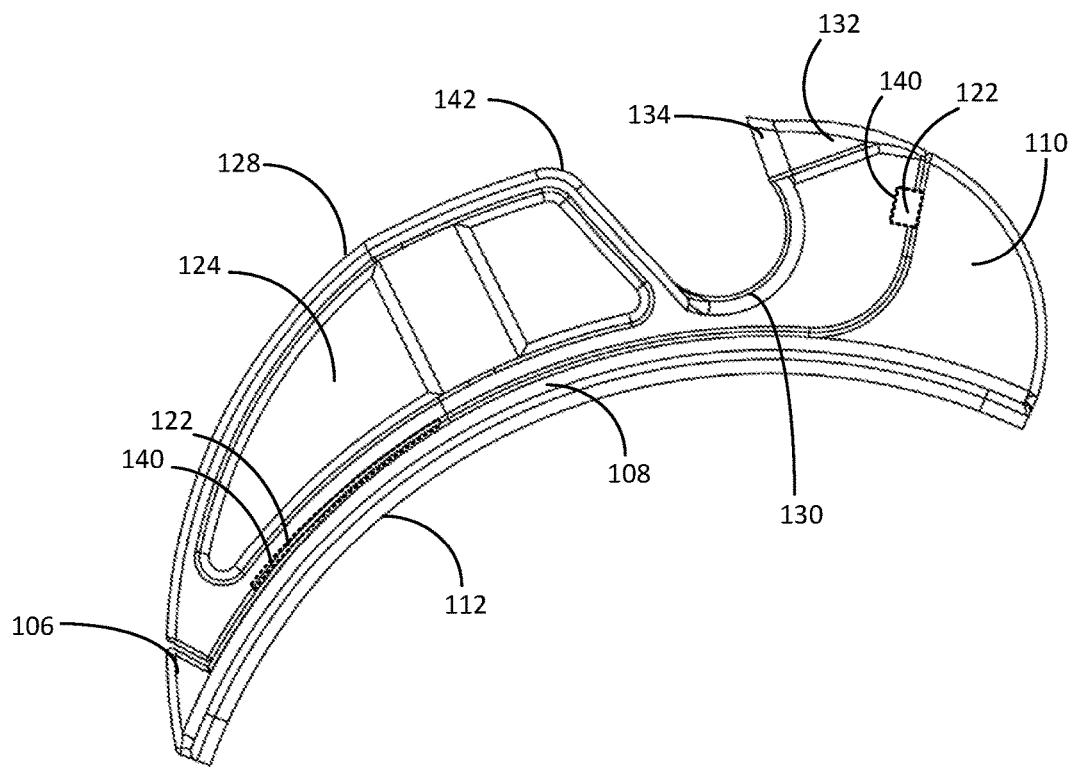
FIG. 3 is a left side view of the mulcher tooth.
Figure 4:
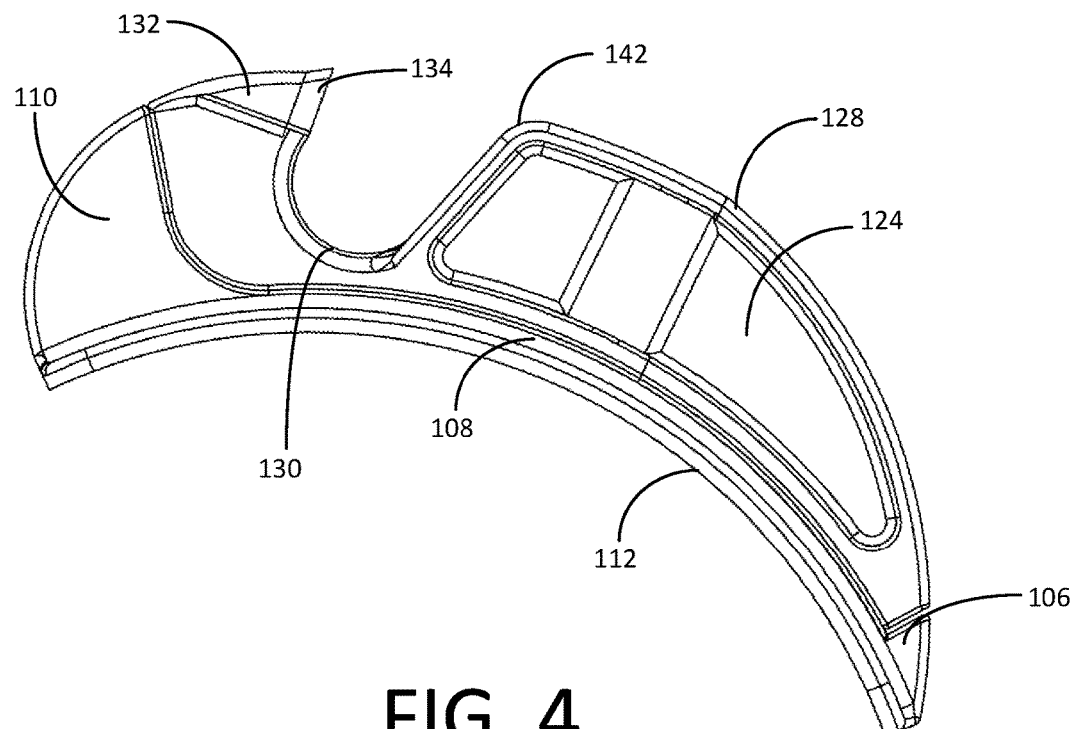
FIG. 4 is a right side view of the mulcher tooth.
Figure 5:
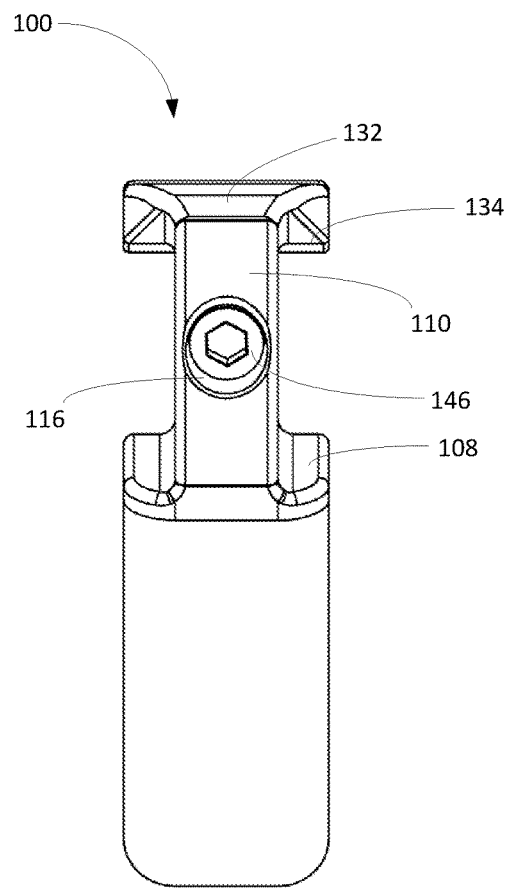
FIG. 5 is a rear end view of the mulcher tooth.
Figure 7:
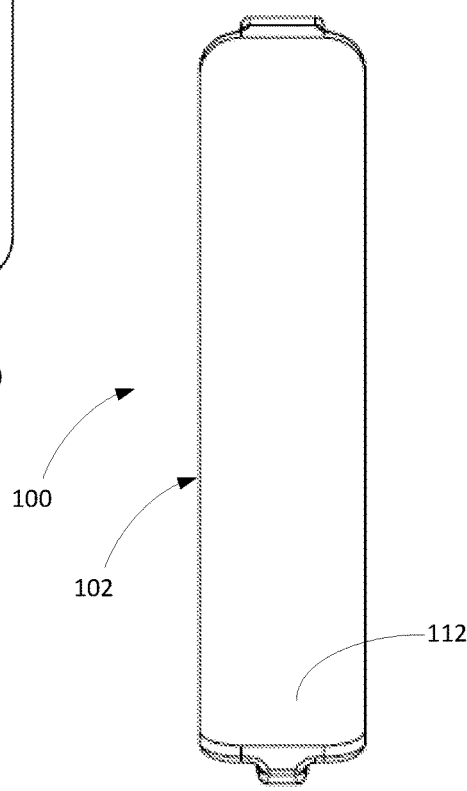
FIG. 7 is a bottom view of the mulcher tooth.
Figure 6:
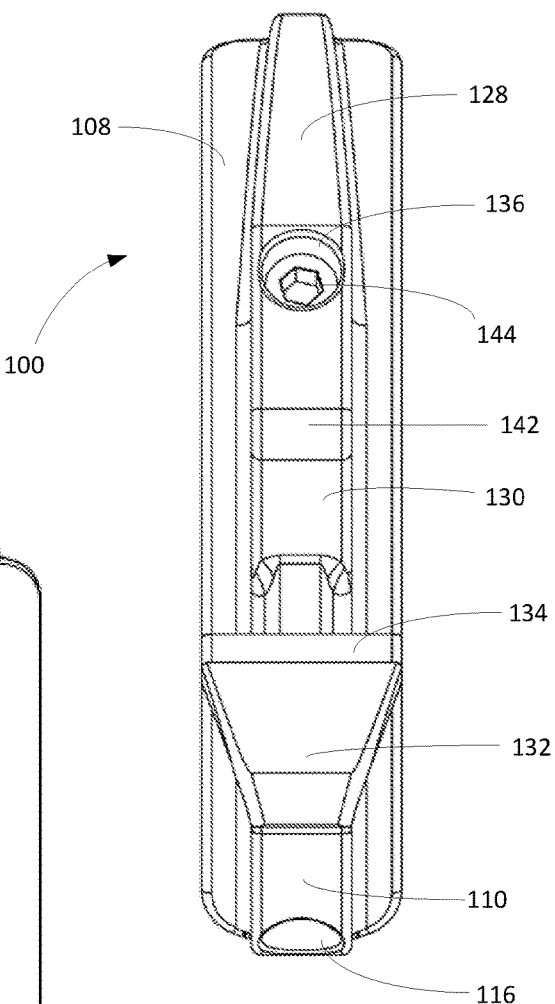
FIG. 6 is a top view of the mulcher tooth.

Similarly, the blade support 132 includes a rear aperture 138 that is configured to align with the rear fastener bore 116 of the base 102. The rear aperture 138 can also be configured so that the rear fastener 146 is countersunk within the blade support 132 when the rear fastener 146 is tightened within the rear aperture 138 and rear fastener bore 116 (as shown in FIG. 2).

Figure 8:
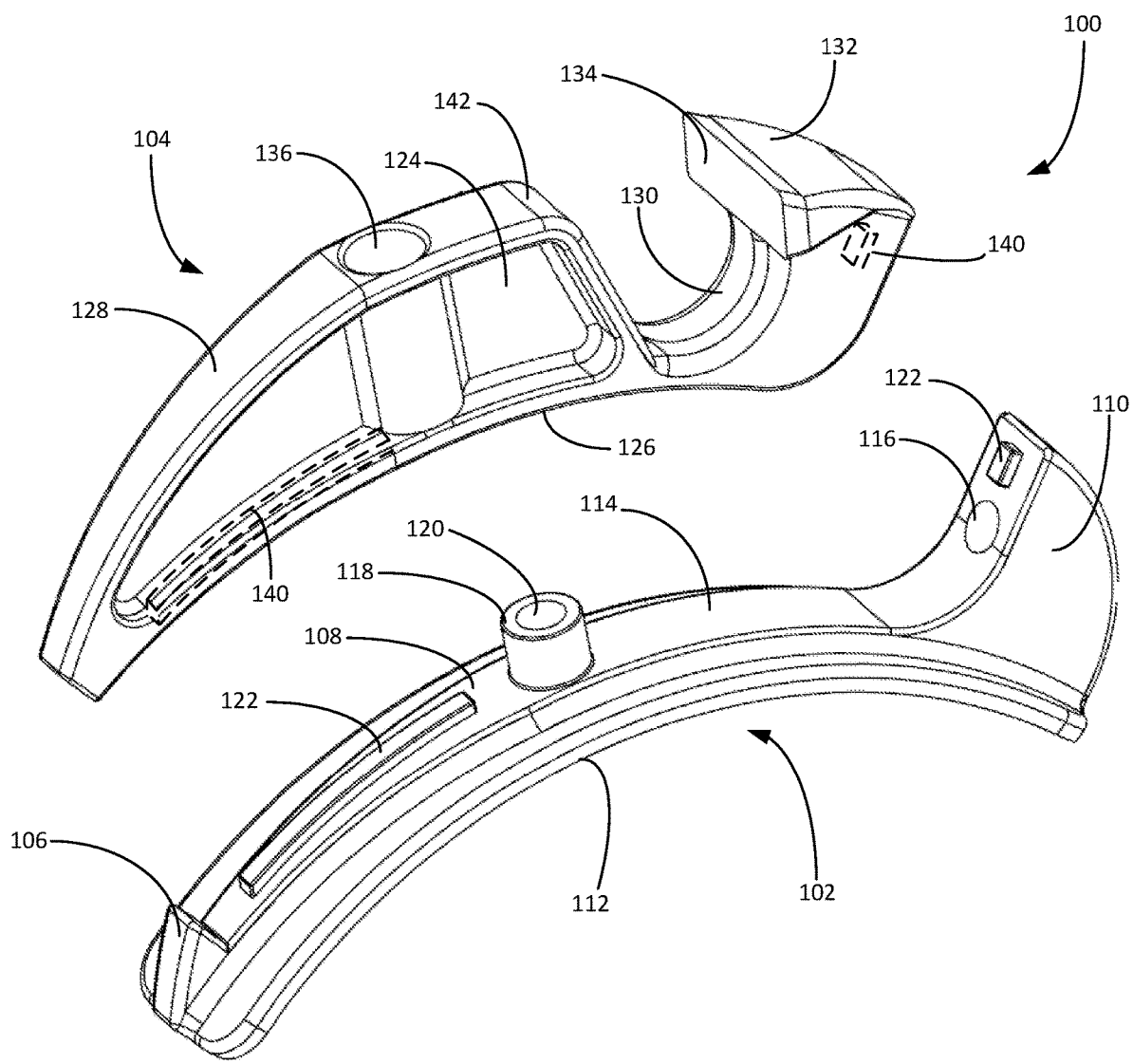
FIG. 8 is an exploded view of the two components of the mulcher tooth.
Figure 9:
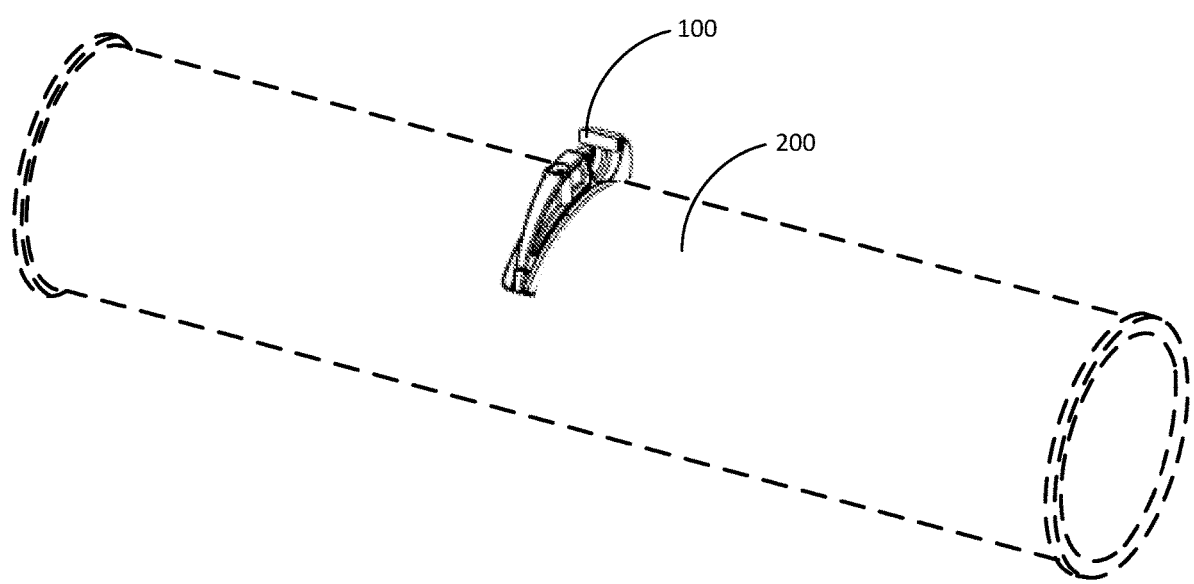
FIG. 9 is a perspective view of the mulcher tooth installed on a rotating drum.

The cutter assembly 104 also includes cutter assembly tab and slot elements 140 that are configured for mating engagement with the corresponding base tab and slot elements 122. As best depicted in FIG. 8, the cutter assembly tab and slot elements 140 include slots that capture the corresponding base tab and slot elements 122 on the upright portion 110 and upper surface 114 of the base 102. The engagement of the cutter assembly tab and slot elements 140 and the base tab and slot elements 122 lock the cutter assembly 104 in registration with the base 102 to oppose twisting or lateral forces applied to the cutter assembly 104 during use.

Figure 10:
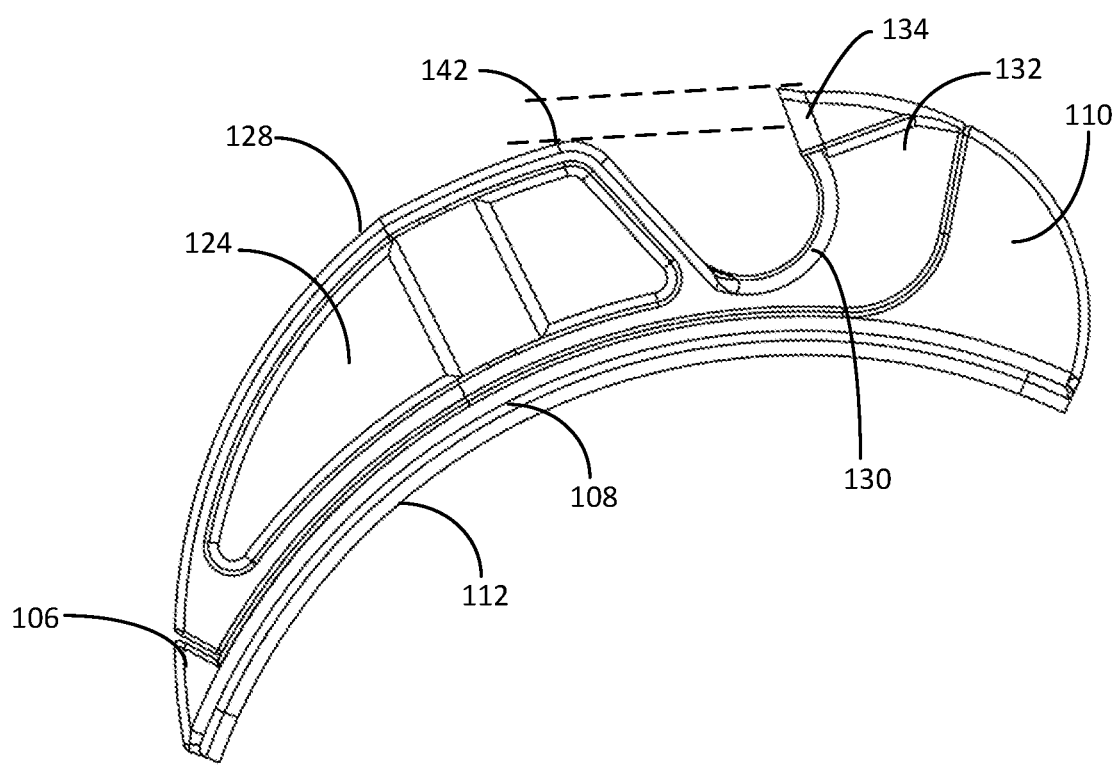
FIG. 10 is a right side view of the mulcher tooth showing the larger height of the tooth beyond the ramp.

The upper ramp surface 128 extends upward from the nose 106 to a ramp apex 142, before dropping into the transition relief 130 adjacent to the blade support 132. The upper ramp surface 128 and the nose 106 each include upper surfaces (not separately designated) that have a common curvature. The upper ramp surface 128 is configured to contact the vegetation in advance of the blade 134. As depicted in FIG. 10, the ramp apex 142 is lower (closer to the base 102) than the blade 134. In this way, the upper ramp surface 128 limits the exposure of the blade 134 to control the depth of the cut formed as the blade 134 passes through the vegetation or other object to be cut.

In some embodiments, the cutter assembly 104 has wear indicators that provide a visible indication that the upper ramp surface 128 is becoming worn and that replacement is recommended to avoid diminishing the performance of the tooth 100.

The blade 134 is permanently or removably attached to the blade support 132. The blade 134 can be constructed from a suitable metal alloy, such as tungsten carbide steel or diamond impregnated steel. The blade 134 may also be provided with wear indicators to provide a visual indication that the blade 134 is becoming worn and that replacement is recommended to avoid diminishing the performance of the tooth 100.

During assembly, the base 102 is welded or otherwise permanently affixed to the rotary drum or other cutting apparatus. The cutter assembly 104 is then placed on top of the base 102 such that the cutter assembly tab and slot elements 138 are registered with the base tab and slot elements 122. Once the cutter assembly 104 has been properly aligned with the base 102, fasteners are inserted through the rear aperture 138 and central aperture 136 and tightened to a specific torque once engaged with the threaded rear fastener bore 116 and front fastener bore 120. Once the blade 134 or upper ramp surface 128 are worn or destroyed, the cutter assembly 104 can be exchanged by removing cutter assembly 104 from the base 102 and repeating the installation process with a new cutter assembly 104.

Unlike prior art designs, in which the depth of the cut is controlled by unitary guards or guards that are permanently attached to the drum or other rotating element, the two-piece tooth 100 permits the replacement of both the blade 134 and upper ramp surface 128 by removing and replacing the cutter assembly 104. Thus, instead of replacing an entire rotary drum when the conventional blade guards are worn or damaged, the embodiments of the present invention permit a simple and less expensive exchange of the cutter assembly 104 by removing the fasteners that hold the cutter assembly 104 to the base 102.

Unless otherwise noted, each element of the tooth 100 is constructed from strong steel. Although the tooth 100 is well-suited for use on a rotating drum assembly that is designed for removing vegetation, it will be appreciated that the tooth 100 can also be used on saws, trenchers and other cutting devices. Thus, it is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems without departing from the scope and spirit of the present invention.

It is claimed:

1. A tooth for use on a rotating element, the tooth comprising:
    a base attached to the rotating element, wherein the base comprises:
        a nose;
        a platform;
        an upright portion; and
    a cutter assembly removably attached to the base, wherein the cutter assembly comprises:
        an upper ramp surface;
        a blade; and
        a transition relief positioned between the upper ram surface and the blade;
        wherein the nose and the upper ramp surface each include upper surfaces that have a common curvature.

2. The tooth of claim 1, wherein the upper ramp surface has a ramp apex that is closer to the base than the blade.

3. The tooth of claim 1, wherein the cutter assembly further comprises a blade support and wherein the blade is affixed to the blade support.

4. The tooth of claim 1, wherein the upright portion has a rear fastener bore and wherein the cutter assembly has a rear aperture that is aligned with the rear fastener bore when the cutter assembly is attached to the base.

5. The tooth of claim 4, wherein the cutter assembly comprises a central aperture and wherein the base comprises a vertical post that is received by the central aperture when the cutter assembly is attached to the base.

6. The tooth of claim 5, wherein the tooth further comprises:
- a front fastener that extends through the central aperture into the vertical post; and
- a rear fastener that extends through the rear fastener bore into the rear aperture of the cutter assembly.

7. The tooth of claim 1, wherein the tooth further comprises:
- one or more base tab and slot elements located on the base; and
- one or more cutter tab and slot elements located on the cutter assembly, wherein each of the one or more cutter tab and slot elements is configured for a mating engagement with a corresponding one of the one or more base tab and slot elements.

8. The tooth of claim 1, wherein the cutter assembly includes a wear indicator that provides a visible indication that the cutter assembly is worn and should be removed from the base and replaced with another cutter assembly.

9. The tooth of claim 1, wherein the rotating element is a horizontally-oriented mulcher drum.

10. A tooth for use on a rotating element, the tooth comprising:
- a base attached to the rotating element, wherein the base includes one or more base tab and slot elements, wherein the base comprises:
  - a nose;
  - a platform; and
  - an upright portion;
- a cutter assembly removably attached to the base, wherein the cutter assembly includes one or more cutter assembly tab and slot elements, and wherein the cutter assembly further comprises:
  - an upper ramp surface adjacent to the nose;
  - a blade support in contact with the upright portion;
  - a blade attached to the blade support; and
  - a transition relief between the upper ramp surface and the blade support; and
- wherein each of the one or more cutter assembly tab and slot elements is configured for a mating engagement with a corresponding one of the one or more base tab and slot elements.

11. The tooth of claim 10, wherein the upper ramp surface has a ramp apex that is closer to the base than the blade.

12. The tooth of claim 11, wherein the nose and the upper ramp surface each include upper surfaces that have a common curvature.

13. The tooth of claim 12, wherein the tooth further comprises:
- a rear fastener bore in the upright portion;
- a rear aperture in the cutter assembly, wherein the rear aperture is aligned with the rear fastener bore when the cutter assembly is attached to the base; and
- a rear fastener that extends through the rear fastener bore into the rear aperture.

14. The tooth of claim 13, wherein the tooth further comprises:
- a vertical post extending from the platform of the base, wherein the vertical post includes a front fastener bore;
- a central aperture in the cutter assembly, wherein the vertical post is received by the central aperture when the cutter assembly is attached to the base; and
- a front fastener that extends through the central aperture into the front fastener bore of the vertical post.

15. The tooth of claim 10, wherein the cutter assembly includes a wear indicator that provides a visible indication that the cutter assembly is worn and should be removed from the base and replaced with another cutter assembly.

16. A rotary drum for use on a vegetation cutting machine, the rotary drum comprising:
- a plurality of teeth, wherein each of the plurality of teeth comprises:
  - the base of claim 1, wherein the base is attached to the rotary drum; and
  - the cutter assembly of claim 1,
- wherein the cutter assembly is removably attached to the base, and wherein the cutter assembly limits the exposure of the blade to the vegetation.

* * * * *